(12) United States Patent
Samie et al.

(10) Patent No.: US 10,626,951 B2
(45) Date of Patent: Apr. 21, 2020

(54) ISOLATOR ASSEMBLY AND A VEHICLE INCLUDING THE ISOLATOR ASSEMBLY

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US); Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 15/675,134

(22) Filed: Aug. 11, 2017

(65) Prior Publication Data
US 2019/0048970 A1   Feb. 14, 2019

(51) Int. Cl.
| F16F 15/14 | (2006.01) |
|---|---|
| F16D 3/12 | (2006.01) |
| F16F 15/121 | (2006.01) |
| F16H 45/02 | (2006.01) |
| F16D 13/00 | (2006.01) |

(52) U.S. Cl.
CPC ............. *F16F 15/145* (2013.01); *F16D 3/12* (2013.01); *F16F 15/1212* (2013.01); *F16F 15/1215* (2013.01); *F16D 13/00* (2013.01); *F16D 2300/22* (2013.01); *F16H 2045/0263* (2013.01)

(58) Field of Classification Search
CPC ...... F16F 15/145; F16D 3/12; F16D 2300/22; F16H 2045/0226; F16H 2045/0263
See application file for complete search history.

(56) References Cited

U.S. PATENT DOCUMENTS

| 10,107,372 | B2* | 10/2018 | Depraete | F16H 45/02 |
|---|---|---|---|---|
| 2016/0208876 | A1* | 7/2016 | Movlazada | F16F 15/145 |
| 2016/0281830 | A1* | 9/2016 | Sekiguchi | F16H 45/02 |
| 2017/0268598 | A1* | 9/2017 | Fenioux | F16F 15/1213 |

* cited by examiner

*Primary Examiner* — Huan Le
(74) *Attorney, Agent, or Firm* — Quinn IP Law (57) ABSTRACT

An isolator assembly includes a clutch configured to operate in a full locked condition and a slip condition. Additionally, the isolator assembly includes a damper and a centrifugal pendulum absorber (CPA). The damper is configured to reduce oscillation when the clutch is in one of the full locked condition and the slip condition. The damper includes a blade that is biasable. The CPA is coupled to the damper and configured to reduce oscillation when the clutch is in one of the full locked condition and the slip condition.

A vehicle includes an engine and a transmission. The engine includes an output shaft and the transmission includes an input member. The vehicle includes the isolator assembly operable between the output shaft and the input member.

20 Claims, 4 Drawing Sheets

ISOLATOR ASSEMBLY AND A VEHICLE INCLUDING THE ISOLATOR ASSEMBLY

INTRODUCTION

A vehicle can include an engine and a transmission coupled to the engine. Generally, the transmission is coupled to the engine to receive torque outputted from the engine. The vehicle can include a torque converter connected to an output shaft of the engine and an input member of the transmission. The torque converter can provide the desired multiplication of torque from the engine into the transmission.

SUMMARY

The present disclosure provides an isolator assembly that includes a clutch configured to operate in a full locked condition and a slip condition. Additionally, the isolator assembly includes a damper and a centrifugal pendulum absorber (CPA). The damper is configured to reduce oscillation when the clutch is in one of the full locked condition and the slip condition. The damper includes a blade that is biasable. The CPA is coupled to the damper and configured to reduce oscillation when the clutch is in one of the full locked condition and the slip condition.

The isolator assembly optionally includes one or more of the following:
A) the CPA is coupled to the damper upstream from the blade relative to the direction that torque is transferred across the isolator assembly;
B) the damper includes a roller that engages the blade, and wherein the CPA is directly coupled to the roller;
C) the clutch is disposed upstream from the damper and the CPA relative to the direction that torque is transferred across the isolator assembly;
D) the clutch is disposed downstream from the damper and the CPA relative to the direction that torque is transferred across the isolator assembly;
E) the CPA is coupled to the damper downstream from the blade relative to the direction that torque is transferred across the isolator assembly;
F) the damper includes a pair of side plates spaced from each other, with the blade disposed between the side plates;
G) the CPA is directly attached to one of the side plates;
H) the CPA is further defined as a first CPA;
I) a second CPA spaced from the first CPA such that the blade is disposed between the first CPA and the second CPA;
J) the first CPA is directly attached to one of the side plates;
K) the damper includes a roller disposed between the side plates and the roller engages the blade;
L) the second CPA is directly coupled to the roller through the other one of the side plates;
M) the clutch is disposed upstream from the damper, the first CPA and the second CPA relative to the direction that torque is transferred across the isolator assembly;
N) the clutch is disposed downstream from the damper, the first CPA and the second CPA relative to the direction that torque is transferred across the isolator assembly;
O) a pump;
P) a turbine fluidly connected to the pump;
Q) the blade of the damper is coupled to the turbine;
R) the pump is operable upstream from the clutch relative to the direction that torque is transferred across the isolator assembly;
S) a casing that houses the pump, the turbine, the damper, the CPA and the clutch;
T) the damper includes a connector spaced from the CPA;
U) the connector of the damper is coupled to the casing;
V) the pump is operable upstream from the turbine relative to the direction that torque is transferred across the isolator assembly;
W) the pump and the turbine are rotatable at different speeds when the clutch is in the slip condition; and
X) the clutch is operable in the full locked condition in which the clutch locks the pump and the turbine together such that the pump and the turbine rotate at the same speed.

The present disclosure also provides a vehicle that includes an engine and a transmission. The engine includes an output shaft and the transmission includes an input member. The vehicle includes an isolator assembly operable between the output shaft and the input member. The isolator assembly includes a clutch configured to operate in a full locked condition and a slip condition. The isolator assembly further includes a damper and a centrifugal pendulum absorber (CPA). The damper is configured to reduce oscillation when the clutch is in one of the full locked condition and the slip condition. The damper includes a blade that is biasable. The CPA is coupled to the damper and configured to reduce oscillation when the clutch is in one of the full locked condition and the slip condition.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
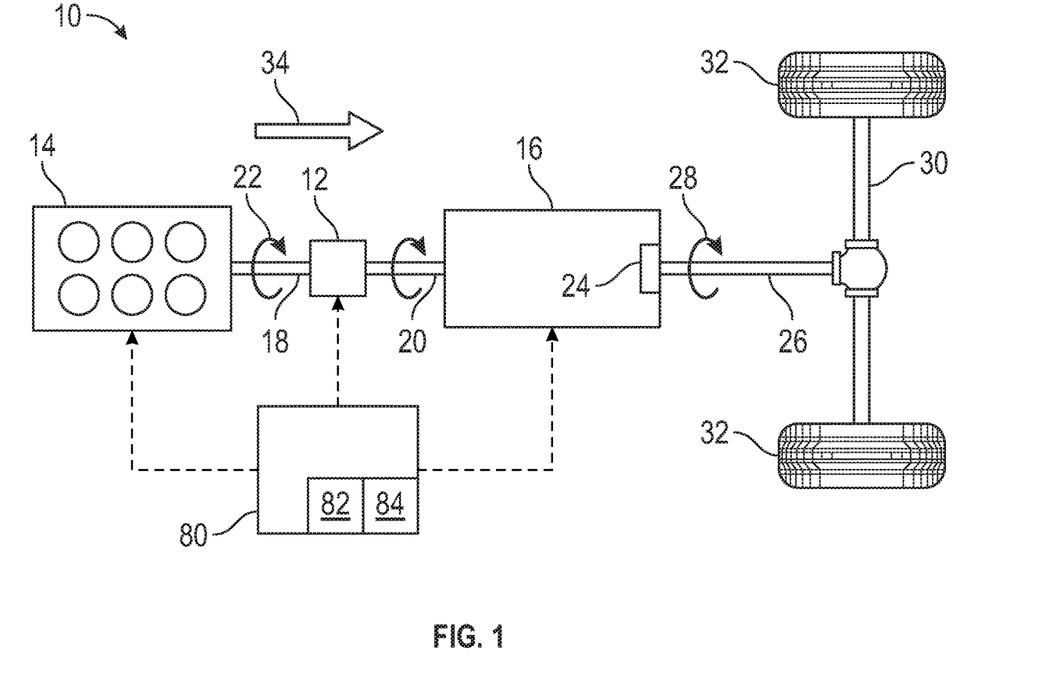
FIG. 1 is a schematic illustration of a vehicle including an isolator assembly.

Referring to the FIGS., wherein like numerals indicate like or corresponding parts throughout the several views, a vehicle 10 and an isolator assembly 12 are shown in FIG. 1. The isolator assembly 12 can be utilized in a vehicle application or a non-vehicle application. Non-limiting examples of the vehicle 10 can include cars, trucks, all-terrain vehicles, off-road vehicles, recreational vehicles, aircrafts, boats, watercrafts, farm equipment or any other suitable movable platform. Additionally, the vehicle 10 can include autonomously driven vehicles or vehicles driven via a human. Furthermore, the vehicle 10 can be an electric vehicle, a hybrid vehicle or a traditional gas powered vehicle. Non-limiting examples of the non-vehicles can include machines, farm equipment or any other suitable non-vehicle.

Continuing with FIG. 1, the vehicle 10 can include an engine 14 and a transmission 16 coupled to the engine 14. Generally, the transmission 16 is coupled to the engine 14 to receive torque outputted from the engine 14. The engine 14 can be an internal combustion engine 14 or any other suitable type of engine 14. The engine 14 can include an output shaft 18, and the transmission 16 can include an input member 20. The output shaft 18 of the engine 14 rotates at an engine speed 22 (see arrow 22 in FIG. 1), and torque from rotation of the output shaft 18 is transferred to the input member 20 of the transmission 16, which causes the input member 20 to rotate. The powertrain of the vehicle 10 can include one or more electric traction motors in an optional hybrid embodiment to provide additional sources of input torque. Non-limiting examples of the transmission 16 can include automatic transmission, dual clutch transmission, automated manual transmission, continuously variable transmission (CVT), etc.

Again continuing with FIG. 1, the transmission 16 can include a final drive 24 surrounding the input member 20 and an output member 26 that delivers output torque 28 (see arrow 28 in FIG. 1) to one or more drive axles 30 through the final drive 24, and ultimately to a set of wheels 32. Therefore, torque from the engine 14 is transferred to the transmission 16, and the transmission 16 outputs torque to drive the wheels 32. It is to be appreciated that the final drive 24 can be driven by an endless rotatable member, and non-limiting examples of the endless rotatable member can include a belt or a chain.

Referring to the FIGS., the isolator assembly 12 can be utilized. In certain embodiments, the vehicle 10 can include the isolator assembly 12 described herein. In the vehicle application, the isolator assembly 12 is operable between the output shaft 18 and the input member 20. For example, the isolator assembly 12 can be connected to the output shaft 18 of the engine 14 and the input member 20 of the transmission 16. As such, the output shaft 18 of the engine 14 is rotatable to transfer torque in a direction to the input member 20 of the transmission 16 through the isolator assembly 12. Therefore, the direction that torque is transferred across the isolator assembly 12 is illustrated by arrow 34 (see FIGS. 1 and 3-5).

In certain embodiments, the isolator assembly 12 is further defined as a torque converter. The torque converter can provide the desired multiplication of torque from the engine 14 into the transmission 16 at low speeds. As one non-limiting example, the torque converter can be utilized with an automatic transmission.

Operation of the engine 14 creates oscillations, which is transferred through the output shaft 18 to the isolator assembly 12. For example, as the engine 14 operates, vibrations are created by the moving parts. As such, operation of the engine 14 outputs torque, which creates oscillations in the output shaft 18. The isolator assembly 12, as detailed below, reduces an amount of oscillation being outputted therefrom. As such, in certain embodiments, the isolator assembly 12 also reduces the amount of oscillation transferred to the transmission 16 from the engine 14. Furthermore, the isolator assembly 12, as detailed below, lowers torsional forces directed to the transmission 16 from operation of the engine 14.

Referring to FIGS. 2-5, the isolator assembly 12 can optionally include a pump 36 and a turbine 38 fluidly connected to the pump 36. Hence, the pump 36 and the turbine 38 are operable through a fluid coupling 40, in which fluid that moves through the pump 36, due to rotation of the pump 36, is transferred to the turbine 38 which causes rotation of the turbine 38. Therefore, simply stated, the pump 36 and the turbine 38 are each rotatable. The pump 36 and the turbine 38 can be rotatable concurrently or independently of each other, which will be discussed further below. More specifically, the torque converter can include the pump 36 and the turbine 38 discussed herein.

Generally, in the vehicle application, the pump 36 is coupled to the output shaft 18 of the engine 14 and the turbine 38 is coupled to the input member 20 of the transmission 16. Therefore, in certain embodiments, the pump 36 can be operable upstream from the turbine 38 relative to the direction that torque is transferred across the isolator assembly 12.

A fluid is transferable from the pump 36 to the turbine 38, and back again, in a loop during rotation of the pump 36 and the turbine 38. The fluid can be a liquid fluid, and non-limiting examples of the liquid fluid can include transmission fluid, oil, synthetic oil, etc.

The engine 14 can include a plate fixed to the output shaft 18 (of the engine 14). The plate of the engine 14 can be directly or indirectly fixed to the output shaft 18. Therefore, the plate of the engine 14 and the output shaft 18 are rotatable concurrently. As such, the plate of the engine 14 rotates at the same speed as the output shaft 18. The plate of the engine 14 can be referred to as a flywheel, a drive plate or a flex plate.

Figure 2:
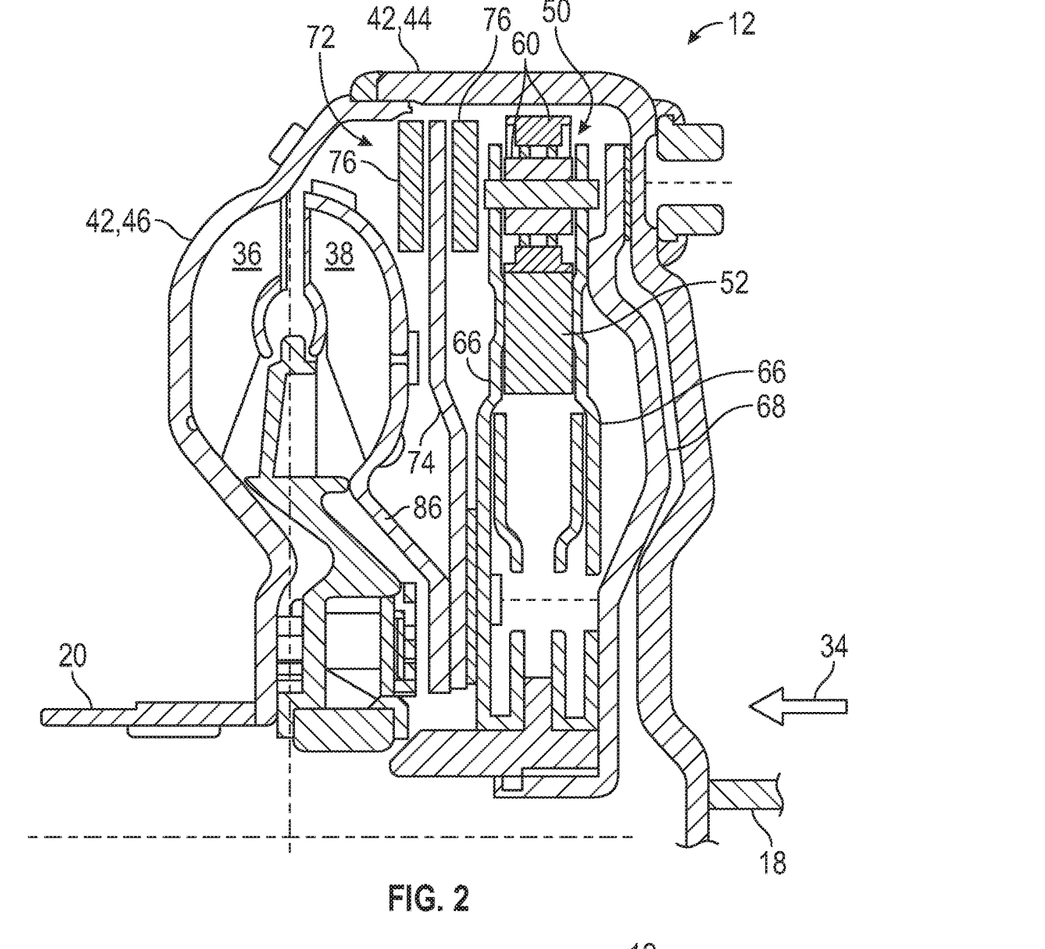
FIG. 2 is a schematic fragmentary illustration of a pump, a turbine, a damper and a centrifugal pendulum absorber of the isolator assembly.

Referring to FIG. 2, the isolator assembly 12 can include a casing 42. The casing 42 can be fixed to the plate of the engine 14 either directly or indirectly. In certain embodiments, the casing 42 can contain the pump 36 and the turbine 38. Furthermore, the casing 42 can be split into separate pieces, for example, the casing 42 can include a first casing portion 44 and a second casing portion 46 (see FIG. 2). The plate of the engine 14 can be fixed to the output shaft 18 through the casing 42, and more specifically, through the first casing portion 44. Therefore, rotation of the output shaft 18 from operation of the engine 14 can be directed through the plate (or flywheel) of the engine 14, and this rotation is then directed through the first casing portion 44 of the isolator assembly 12 via the plate (or flywheel).

The second casing portion 46 can house at least part of the pump 36. Movement of the second casing portion 46 causes movement of the pump 36. The first casing portion 44 can be fixed to the plate of the engine 14 by one or more fastener, such as a bolt, a pin, etc., or welded thereto. The second casing portion 46 can be fixed (either directly or indirectly) to the first casing portion 44 by one or more fastener, such as a bolt, a pin, etc., or welded thereto. The pump 36 is rotatable with the plate of the engine 14 through the casing 42. Therefore, the plate of the engine 14, the output shaft 18 and the pump 36 are rotatable concurrently. As such, the pump 36 rotates at the same speed as the output shaft 18. Rotation of the pump 36 causes the fluid inside the pump 36 to move toward the turbine 38. Movement of the fluid into the turbine 38 from the pump 36 causes the turbine 38 to rotate. As such, the pump 36 and the turbine 38 are fluidly connected. The pump 36 is rotatable to transfer torque through the turbine 38. The turbine 38 can rotate at the same speed or a different speed from the pump 36, which is discussed further below.

Figure 3:
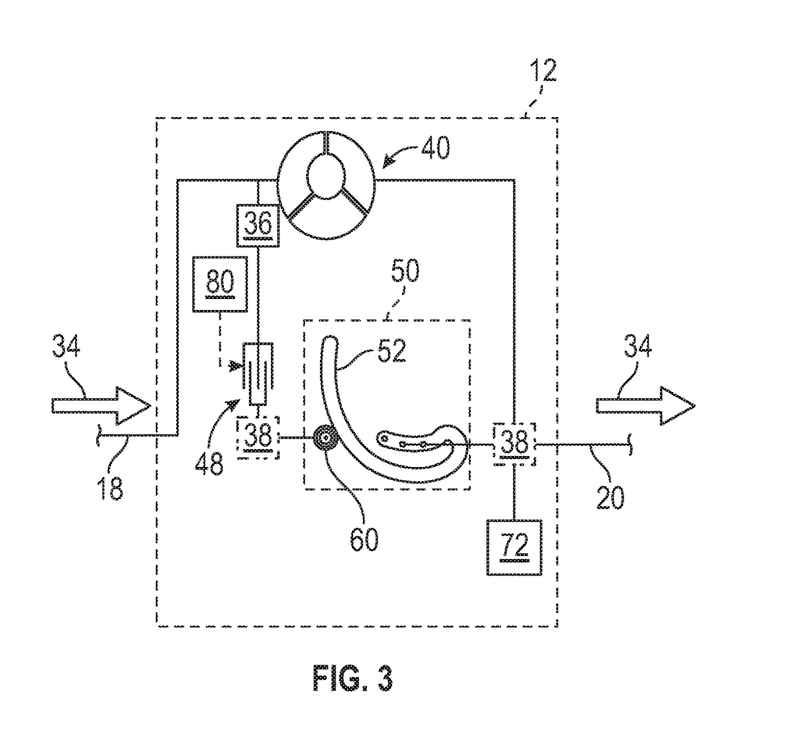
FIG. 3 is a schematic illustration of the isolator assembly of one configuration.
Figure 4:
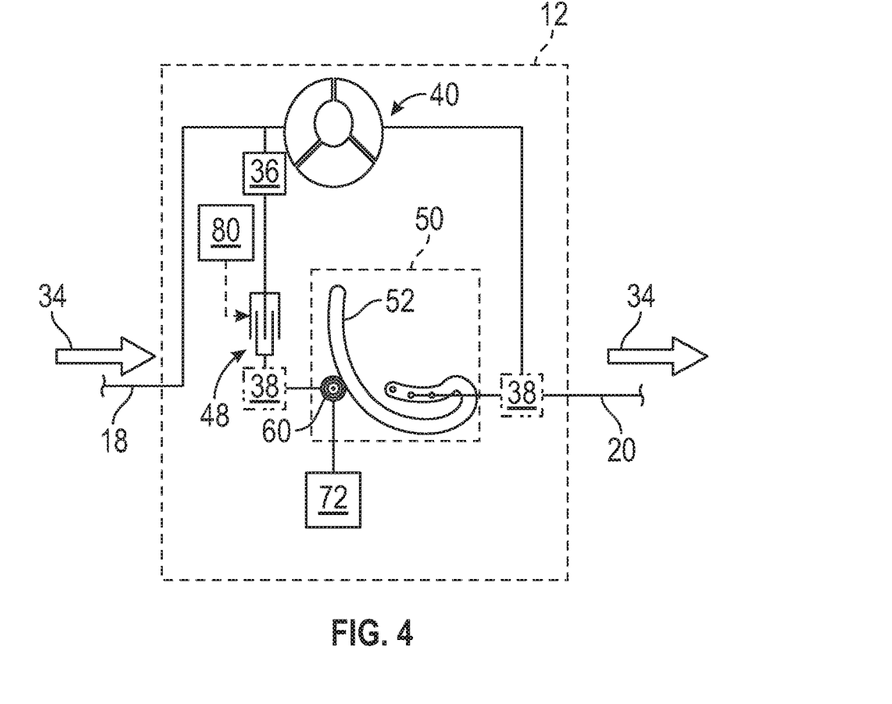
FIG. 4 is a schematic illustration of the isolator assembly of another configuration.
Figure 5:
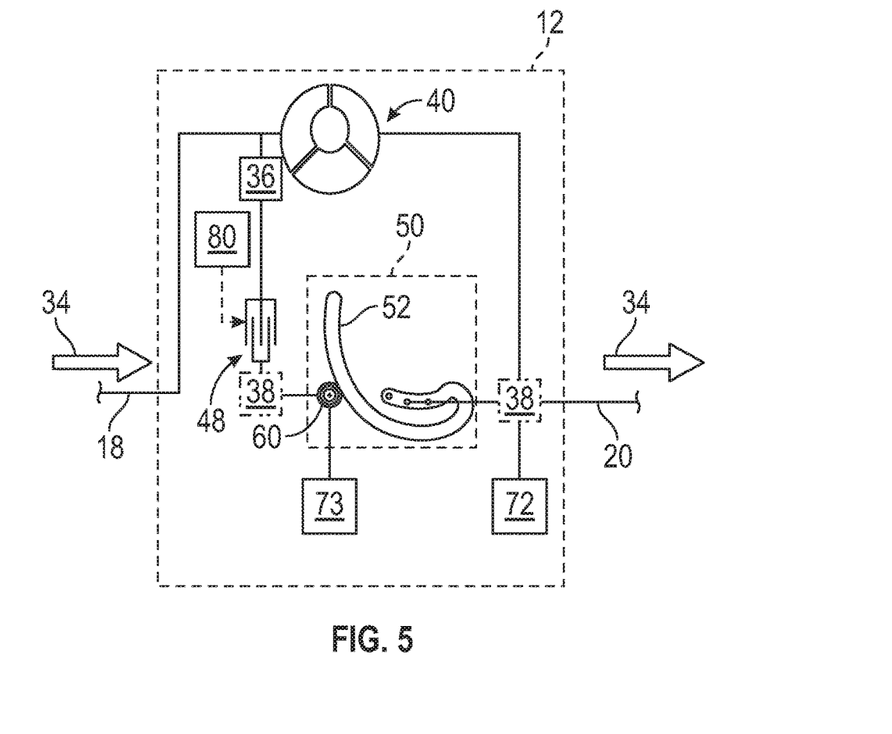
FIG. 5 is a schematic illustration of the isolator assembly of yet another configuration.

Referring to FIGS. 3-5 and 8, the isolator assembly 12 includes a clutch 48. The operable location of the clutch 48 can be changed depending on the type of transmission 16 being utilized, which will be discussed further below. In certain embodiments, the clutch 48 is operable between the pump 36 and the turbine 38. As non-limiting examples, as shown in FIGS. 3-5, the pump 36 can be operable upstream from the clutch 48 relative to the direction that torque is transferred across the isolator assembly 12.

The clutch 48 is configured to operate in a full locked condition and a slip condition. Simply stated, in the full locked condition, the clutch 48 can operate to lock the pump 36 and the turbine 38 together. Therefore, the full locked condition allows the pump 36 and the turbine 38 to rotate at the same speed. Said differently, the clutch 48 locks the pump 36 and the turbine 38 together when in the full locked condition. As such, the clutch 48 can operate to prevent slip between the pump 36 and the turbine 38.

In the slip condition, the clutch 48 can operate to allow slip between the pump 36 and the turbine 38. Therefore, the pump 36 and the turbine 38 can rotate at different speeds when the clutch 48 is in the slip condition. The clutch 48 can be adjustable to change an amount of pressure clamping together friction plates. Therefore, depending on the desired amount of slip between the pump 36 and the turbine 38, the amount of pressure that clamps the friction plates together can be changed by a solenoid of the clutch 48 to allow the pump 36 and the turbine 38 to slip relative to each other.

Referring to FIGS. 2-6 and 8, the isolator assembly 12 includes a damper 50 that is configured to reduce oscillation when the clutch 48 is in one of the full locked condition and the slip condition. Therefore, the damper 50 can reduce oscillations when the clutch 48 is in the full locked condition. Furthermore, the damper 50 can reduce oscillations when the clutch 48 is in the slip condition. In certain embodiments, the damper 50 can be operable upstream from the turbine 38 relative to the direction that torque is transferred across the isolator assembly 12. In other embodiments, the damper 50 can be operable downstream from the turbine 38 relative to the direction that torque is transferred across the isolator assembly 12. FIGS. 3-5 illustrate schematically the turbine 38 in phantom lines in two different suitable operable locations. The turbine 38 can be in either of the illustrated locations, i.e., one or the other, not both. Furthermore, the damper 50 can be operable in a parallel relationship relative to the fluid coupling 40 between the pump 36 and the turbine 38.

The damper 50 is configured to reduce oscillation from the pump 36 toward the turbine 38. As such, oscillations from the engine 14 are transferred to the damper 50 through the pump 36, and the damper 50 reduces those oscillations. Simply stated, the damper 50 can dampen oscillations from the engine 14, which thus reduces the amount of oscillations being transferred to the input member 20 of the transmission 16.

The damper 50 is configured to reduce oscillation from operation of the engine 14 to the input member 20 of the transmission 16 when the clutch 48 is in the full locked condition or the slip condition. In certain embodiments, the clutch 48 is operable in the full locked condition in which the clutch 48 locks the pump 36 and the turbine 38 together such that the pump 36 and the turbine 38 rotate at the same speed. In various embodiments, the clutch 48 is operable in the full locked condition in which the clutch 48 locks the pump 36 and the turbine 38 together through the damper 50 such that the pump 36 and the turbine 38 rotate at the same speed.

Figure 6:
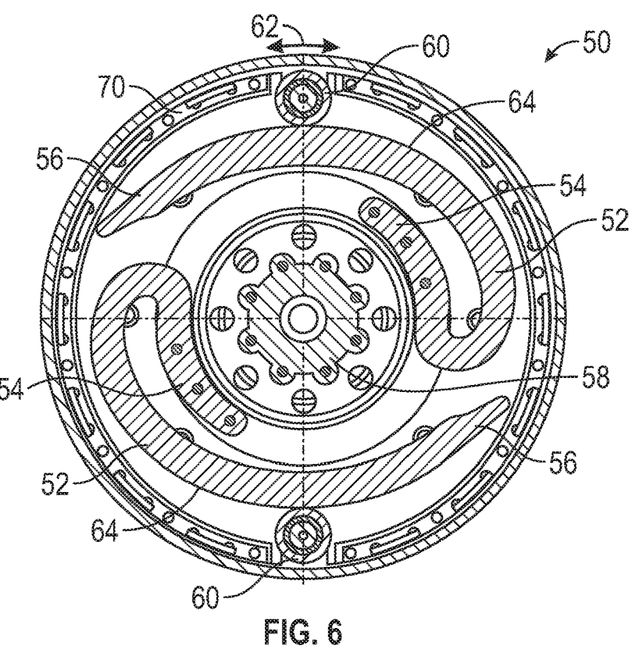
FIG. 6 is a schematic cross-sectional view of part of the damper.

Referring to FIG. 2, the damper 50 includes a blade 52 that is biasable. In certain embodiments, the blade 52 of the damper 50 is coupled to the turbine 38. As best shown in FIG. 6, the blade 52 is fixed at one end 54, i.e., a fixed end 54, and extends to a distal end 56. The blade 52 is cantilevered as the blade 52 extends away from the fixed end 54 toward the distal end 56 such that a portion of the blade 52 is biasable away from the fixed end 54. The damper 50 can include a hub 58 that is coupled to the input member 20 of the transmission 16. The fixed end 54 of the blade 52 can be secured to the hub 58. In certain embodiments, the damper 50 can include a plurality of blades 52 spaced from each other, and each of the blades 52 can be configured as discussed herein.

Continuing with FIG. 6, the damper 50 can include a roller 60 that engages the blade 52. The roller 60 is movable back and forth (see arrow 62 in FIG. 6) relative to the blade 52, which causes the blade 52 to bias toward the hub 58 and away from the hub 58 to reduce oscillation that is outputted to the transmission 16. The roller 60 can rotate along an edge 64 of the blade 52. Generally, the blade 52 is disposed between the roller 60 and the hub 58. Furthermore, the roller 60 can directly or indirectly engage the blade 52. If the damper 50 utilizes a plurality of blades 52, then the damper 50 can include a plurality of rollers 60, with one of the rollers 60 engaging one of the blades 52, and another one of the rollers 60 engaging another one of the blades 52, etc. Each of the rollers 60 can be configured as discussed herein.

Furthermore, as best shown in FIG. 2, the damper 50 can include a pair of side plates 66 spaced from each other. The blade 52 can be disposed between the side plates 66, and the roller 60 can be disposed between the side plates 66. If the damper 50 utilizes a plurality of blades 52 and a plurality of rollers 60, then each of the blades 52 and rollers 60 can be disposed between the side plates 66.

The damper 50 can also include a connector 68 coupled to the casing 42. In certain embodiments, the connector 68 can be directly attached to the casing 42. Alternatively, the connector 68 of the damper 50 can be indirectly attached to the casing 42. The connector 68 couples the damper 50 to the casing 42 such that rotation can be transferred from the pump 36 to the damper 50. In certain embodiments, the first casing portion 44 can be attached to the connector 68. It is to be appreciated that the connector 68 can be coupled to the casing 42 by any suitable method such that the connector 68 and the casing 42 are rotatable in unison, e.g., rotate at the same speed, and non-limiting examples can include fasteners, welding, adhesive, couplers, clamps, etc. It is to be appreciated that the damper 50 can include other components not specifically discussed herein, and for example, the damper 50 can include an outer plate 70 surrounding the blade(s) 52 and the roller(s) 60 can be disposed in grooves adjacent the outer plate 70, etc.

Referring to FIG. 2, the isolator assembly 12 includes a centrifugal pendulum absorber 72 (CPA) coupled to the damper 50 and configured to reduce oscillation when the clutch 48 is in one of the full locked condition and the slip condition. Therefore, the CPA 72 can reduce oscillations when the clutch 48 is in the full locked condition. Furthermore, the CPA 72 can reduce oscillations when the clutch 48 is in the slip condition.

In certain embodiments, as shown in FIGS. 3-5, the clutch 48 can be disposed upstream from the damper 50 and the CPA 72 relative to the direction that torque is transferred across the isolator assembly 12. The clutch 48 can be operable in the full locked condition in which the clutch 48 locks the pump 36 and the turbine 38 such that the pump 36 and the turbine 38 rotate at the same speed. If the turbine 38 is downstream from the damper 50, the clutch 48 can be operable in the full locked condition in which the clutch 48 locks the pump 36 and the turbine 38 together through the damper 50 and the CPA 72 such that the pump 36 and the turbine 38 rotate at the same speed. In certain embodiments, the connector 68 of the damper 50 can be spaced from the CPA 72.

Figure 8:
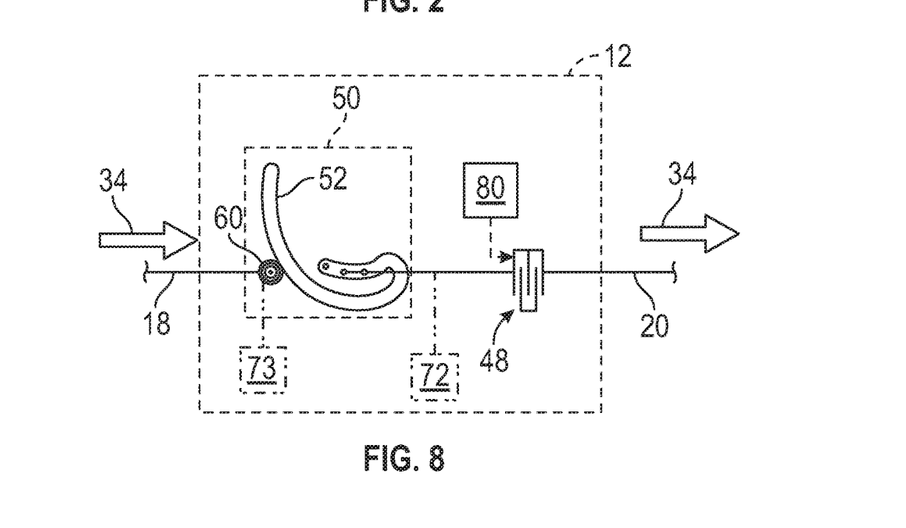
FIG. 8 is a schematic illustration of the isolator assembly of yet another configuration.

In other embodiments, as shown in FIG. 8, the clutch 48 can be disposed downstream from the damper 50 and the CPA 72 relative to the direction that torque is transferred across the isolator assembly 12. In this embodiment, the clutch 48 locks the damper 50 and the CPA 72 to the plate (or flywheel) of the engine 14. Generally, as non-limiting examples, the embodiment of FIG. 8 can be utilized with a manual transmission or a dual clutch transmission.

Figure 7:
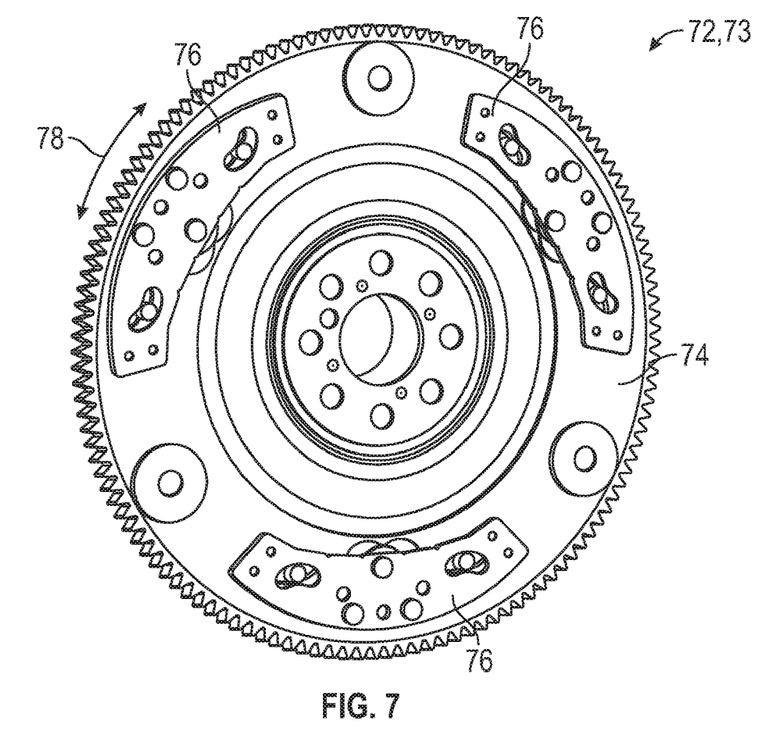
FIG. 7 is a schematic perspective view of part of the centrifugal pendulum absorber.

The CPA 72 can include a central support 74 and a weight member 76 coupled to the central support 74. The weight member 76 is movable back and forth (see arrow 78 in FIG. 7) relative to the central support 74, which reduces oscillation from the pump 36 toward the turbine 38. The weight member 76 can be disposed on both sides of the central support 74. In certain embodiments, the CPA 72 can include a plurality of weight members 76 spaced from each other, and each of the weight members 76 can be configured as discussed herein.

In certain embodiments, as shown in FIG. 3, the CPA 72 is coupled to the damper 50 downstream from the blade 52 relative to the direction that torque is transferred across the isolator assembly 12. In this embodiment, the CPA 72 can be directly attached to one of the side plates 66 of the damper 50. As shown in FIG. 2, the central support 74 can be attached to one of the side plates 66 of the damper 50. Furthermore, the clutch 48 can be disposed upstream from the damper 50 and the CPA 72 relative to the direction that torque is transferred across the isolator assembly 12.

In other embodiments, as shown in FIG. 4, the CPA 72 is coupled to the damper 50 upstream from the blade 52 relative to the direction that torque is transferred across the isolator assembly 12. In this embodiment, the CPA 72 can be directly coupled to the roller 60. Furthermore, the clutch 48 can be disposed upstream from the damper 50 and the CPA 72 relative to the direction that torque is transferred across the isolator assembly 12.

In yet other embodiments, as shown in FIG. 5, the CPA 72 is further defined as a first CPA 72, and the isolator assembly 12 can further include a second CPA 73 spaced from the first CPA 72 such that the blade 52 is disposed between the first CPA 72 and the second CPA 73. Therefore, generally, the damper 50 can be disposed between the first CPA 72 and the second CPA 73. As such, one of the CPAs 72, 73 can be disposed upstream from the blade 52 relative to the direction that torque is transferred across the isolator assembly 12 and another one of the CPAs 72, 73 can be disposed downstream from the blade 52 relative to the direction that torque is transferred across the isolator assembly 12. In this embodiment, the central support 74 of the first CPA 72 can be attached to one of the side plates 66 of the damper 50 and the central support 74 of the second CPA 73 can be attached to one of the rollers 60. In certain embodiments, the first CPA 72 is directly attached to one of the side plates 66 of the damper 50 and the second CPA 73 is directly coupled to the roller 60 of the damper 50 through the other one of the side plates 66. Furthermore, the clutch 48 can be disposed upstream from the damper 50, the first CPA 72 and the second CPA 73 relative to the direction that torque is transferred across the isolator assembly 12. The second CPA 73 can be configured as discussed herein for the first CPA 72.

In other embodiments, as shown in FIG. 8, the clutch 48 can be disposed downstream from the damper 50, the first CPA 72 and the second CPA 73 relative to the direction that torque is transferred across the isolator assembly 12. In this embodiment, the clutch 48 locks the damper 50, the first CPA 72 and the second CPA 73 to the plate (or flywheel) of the engine 14. Again, as non-limiting examples, the embodiment of FIG. 8 can be utilized with a manual transmission or a dual clutch transmission. FIG. 8 illustrates schematically the CPAs 72, 73 in phantom lines different suitable operable locations. Therefore, one of the CPAs 72, 73 can be eliminated, or both of the CPAs 72, 73 can be utilized at the same time. As such, one of the CPAs 72, 73 can be attached to one of the side plates 66 of the damper 50 and another one of the CPAs 72, 73 can be directly coupled to the roller 60 of the damper 50, for example, directly coupled to the roller 60 of the damper 50 through the other one of the side plates 66.

A controller 80 can be in electrical communication with the isolator assembly 12, the engine 14 and/or the transmission 16. In certain embodiments, the controller 80 is in electrical communication with the clutch 48, and more specifically, with the solenoid of the clutch 48 which operates to control the amount of pressure applied to the friction plates. Therefore, for example, the controller 80 can control which condition the clutch 48 is in, i.e., the full locked condition and the slip condition. When in the slip condition, the controller 80 can control the amount of slip between the pump 36 and the turbine 38. Instructions can be stored in a memory 82 of the controller 80 and automatically executed via a processor 84 of the controller 80 to provide the respective control functionality.

The controller 80 is configured to execute the instructions from the memory 82, via the processor 84. For example, the controller 80 can be a host machine or distributed system, e.g., a computer such as a digital computer or microcomputer, and, as the memory 82, tangible, non-transitory computer-readable memory such as read-only memory (ROM) or flash memory. The controller 80 can also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 80 can include all software, hardware, memory 82, algorithms, connections, sensors, etc., necessary to control, for example, the clutch 48. As such, a control method operative to control the clutch 48, can be embodied as software or firmware associated with the controller 80. It is to be appreciated that the controller 80 can also include any device capable of analyzing data from various sensors, comparing data, making the necessary decisions required to control and/or monitor the clutch 48, the isolator assembly 12, the engine 14 and/or the transmission 16. Optionally, more than one controller 80 can be utilized.

Referring to FIG. 2, the casing 42 can house the pump 36, the turbine 38, the damper 50, the CPA 72 and the clutch 48. In certain embodiments, the casing 42 can house the pump 36, the turbine 38, the damper 50, the first CPA 72, the second CPA 73 and the clutch 48. In other embodiments, the casing 42 can house the damper 50, the clutch 48, the first CPA 72 and/or the second CPA 73.

Again, continuing with FIG. 2, the turbine 38 can include a shell 86. In certain embodiments, one of the CPAs 72, 73 and the shell 86 can be attached to each other. More specifically, the central support 74 of one of the CPAs 72, 73 can be attached to the shell 86 of the turbine 38. In other embodiments, one of the side plates 66 of the damper 50 and the shell 86 can be attached to each other. Generally, torque is transferred out of the isolator assembly 12 through the shell 86. It is to be appreciated that the shell 86 can be attached to one of the CPAs 72, 73 or the damper 50 directly or indirectly. Furthermore, the shell 86 can be attached by any suitable methods, and non-limiting examples can include fasteners, welding, adhesive, couplers, clamps, etc.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An isolator assembly comprising:
a clutch configured to operate in a full locked condition and a slip condition;
a damper configured to reduce oscillation when the clutch is in one of the full locked condition and the slip condition, and wherein the damper includes a blade being biasable; and
a centrifugal pendulum absorber (CPA) coupled to the damper and configured to reduce oscillation when the clutch is in one of the full locked condition and the slip condition.

2. The assembly as set forth in claim 1 wherein the CPA is coupled to the damper upstream from the blade relative to a direction that torque is transferred across the isolator assembly.

3. The assembly as set forth in claim 2 wherein the damper includes a roller that engages the blade, and wherein the CPA is directly coupled to the roller.

4. The assembly as set forth in claim 3 wherein the clutch is disposed upstream from the damper and the CPA relative to the direction that torque is transferred across the isolator assembly.

5. The assembly as set forth in claim 3 wherein the clutch is disposed downstream from the damper and the CPA relative to the direction that torque is transferred across the isolator assembly.

6. The assembly as set forth in claim 1 wherein the CPA is coupled to the damper downstream from the blade relative to a direction that torque is transferred across the isolator assembly.

7. The assembly as set forth in claim 6 wherein the damper includes a pair of side plates spaced from each other, with the blade disposed between the side plates, and wherein the CPA is directly attached to one of the side plates.

8. The assembly as set forth in claim 7 wherein the clutch is disposed upstream from the damper and the CPA relative to the direction that torque is transferred across the isolator assembly.

9. The assembly as set forth in claim 7 wherein the clutch is disposed downstream from the damper and the CPA relative to the direction that torque is transferred across the isolator assembly.

10. The assembly as set forth in claim 1 wherein the CPA is further defined as a first CPA, and further including a second CPA spaced from the first CPA such that the blade is disposed between the first CPA and the second CPA.

11. The assembly as set forth in claim 10 wherein:
the damper includes a pair of side plates spaced from each other, with the blade disposed between the side plates;
the first CPA is directly attached to one of the side plates;
the damper includes a roller disposed between the side plates and the roller engages the blade; and
the second CPA is directly coupled to the roller through the other one of the side plates.

12. The assembly as set forth in claim 11 wherein the clutch is disposed upstream from the damper, the first CPA and the second CPA relative to a direction that torque is transferred across the isolator assembly.

13. The assembly as set forth in claim 11 wherein the clutch is disposed downstream from the damper, the first CPA and the second CPA relative to a direction that torque is transferred across the isolator assembly.

14. The assembly as set forth in claim 1:
further including a pump;
further including a turbine fluidly connected to the pump;
wherein the blade of the damper is coupled to the turbine; and
wherein the pump is operable upstream from the clutch relative to a direction that torque is transferred across the isolator assembly.

15. The assembly as set forth in claim 14 wherein the clutch is disposed upstream from the damper and the CPA relative to the direction that torque is transferred across the isolator assembly.

16. The assembly as set forth in claim 14:
further including a casing that houses the pump, the turbine, the damper, the CPA and the clutch;
wherein the damper includes a connector spaced from the CPA; and
wherein the connector of the damper is coupled to the casing.

17. The assembly as set forth in claim 14 wherein the pump is operable upstream from the turbine relative to the direction that torque is transferred across the isolator assembly.

18. The assembly as set forth in claim 1:
further including a pump and a turbine; and
wherein the pump and the turbine are rotatable at different speeds when the clutch is in the slip condition.

19. The assembly as set forth in claim 1:
further including a pump and a turbine; and
wherein the clutch is operable in the full locked condition in which the clutch locks the pump and the turbine together such that the pump and the turbine rotate at a same speed.

20. A vehicle comprising:
an engine including an output shaft;
a transmission including an input member;
an isolator assembly operable between the output shaft and the input member, wherein the assembly comprises:

a clutch configured to operate in a full locked condition and a slip condition;

a damper configured to reduce oscillation when the clutch is in one of the full locked condition and the slip condition, and wherein the damper includes a blade being biasable; and a centrifugal pendulum absorber (CPA) coupled to the damper and configured to reduce oscillation when the clutch is in one of the full locked condition and the slip condition.

* * * * *